US011002332B2

(12) United States Patent
Li et al.

(10) Patent No.: US 11,002,332 B2
(45) Date of Patent: May 11, 2021

(54) OVERLOAD PROTECTION MECHANISM AND IMAGE DETECTION DEVICE

(71) Applicant: Wistron Corporation, New Taipei (TW)

(72) Inventors: Chuan-Sheng Li, New Taipei (TW); Chen-An Sung, New Taipei (TW)

(73) Assignee: Wistron Corporation, New Taipei (TW)

( * ) Notice: Subject to any disclaimer, the term of this patent is extended or adjusted under 35 U.S.C. 154(b) by 174 days.

(21) Appl. No.: 16/271,875

(22) Filed: Feb. 10, 2019

(65) Prior Publication Data
US 2020/0132150 A1    Apr. 30, 2020

(30) Foreign Application Priority Data

Oct. 26, 2018    (TW) .................................. 107137878

(51) Int. Cl.
*F16M 13/00*    (2006.01)
*F16F 1/10*    (2006.01)
(Continued)

(52) U.S. Cl.
CPC ................ *F16F 1/10* (2013.01); *F16F 1/121* (2013.01); *F16M 11/2021* (2013.01); *F16M 11/22* (2013.01); *F16F 2228/08* (2013.01); *F16F 2230/0047* (2013.01); *F16F 2230/08* (2013.01); *F16M 11/42* (2013.01); *F16M 2200/068* (2013.01); *F16M 2200/08* (2013.01)

(58) Field of Classification Search
CPC ...... F16F 1/10; F16F 1/121; F16F 2230/0047; F16F 2230/08; F16F 2228/08; F16M 11/2021; F16M 11/22; F16M 2200/068; F16M 11/42; F16M 2200/08
USPC ......... 248/542; 600/471, 427, 429; 414/350; 254/266, 283
See application file for complete search history.

(56) References Cited

U.S. PATENT DOCUMENTS 8,910,913 B2 * 12/2014 Hirose .................... A61B 90/50
  248/123.11
9,121,542 B2 *  9/2015 Odaka .................... F16M 13/02
(Continued)

FOREIGN PATENT DOCUMENTS

| CN | 106926275 A | 7/2017 |
|---|---|---|
| TW | 362027 | 6/1999 |
| TW | M562579 U | 7/2018 |

*Primary Examiner* — Todd M Epps
(74) *Attorney, Agent, or Firm* — Winston Hsu

(57) ABSTRACT

An overload protection mechanism includes a first accommodating member, a second accommodating member, a force storage member, and an object. The second accommodating member is rotatably disposed on the first accommodating member. The force storage member is disposed between the first accommodating member and the second accommodating member. Opposite ends of the force storage member are connected to the first accommodating member and the second accommodating member. The object is connected to the second accommodating member. When an external force is exerted on the object and a torque generated by the external force is larger than a torque provided by the force storage member, the external force forces the object to drive the second accommodating member to rotate with respect to the first accommodating member.

20 Claims, 11 Drawing Sheets

(51) Int. Cl.
*F16F 1/12* (2006.01)
*F16M 11/20* (2006.01)
*F16M 11/22* (2006.01)
*F16M 11/42* (2006.01)

(56) References Cited

U.S. PATENT DOCUMENTS

| | | | |
|---|---|---|---|
| 10,034,721 B1 * | 7/2018 | Timm | A61B 34/30 |
| 10,856,948 B2 * | 12/2020 | Cagle | A61B 90/50 |
| 2017/0065355 A1 * | 3/2017 | Ross | A61B 50/13 |
| 2018/0333215 A1 * | 11/2018 | Timm | A61B 90/57 |
| 2019/0209111 A1 * | 7/2019 | Lin | A61B 6/4405 |
| 2020/0037864 A1 * | 2/2020 | Ushiroda | A61B 90/20 |

* cited by examiner

OVERLOAD PROTECTION MECHANISM AND IMAGE DETECTION DEVICE

BACKGROUND OF THE DISCLOSURE

1. Field of the Disclosure

The disclosure relates to an overload protection mechanism and an image detection device and, more particularly, to an overload protection mechanism capable of preventing a device from toppling over due to overload and an image detection device equipped with the overload protection mechanism.

2. Description of the Prior Art

At present, some devices (e.g. skin detection device) are equipped with an arm, so as to perform operation by extending the arm. In general, the device equipped with the arm has to pass safety test before delivery. For example, the arm of the skin detection device should be able to bear weight over 80 kilograms without toppling over when the arm extends to the maximum length. To pass the aforesaid safety test, the prior art increases the size of a host device of the skin detection device. However, the larger the size of the host device is, the heavier the skin detection device is and the more the space is occupied by the skin detection device.

SUMMARY OF THE DISCLOSURE

The disclosure provides an overload protection mechanism capable of preventing a device from toppling over due to overload, so as to solve the aforesaid problems.

According to an embodiment of the disclosure, an overload protection mechanism comprises a first accommodating member, a second accommodating member, a force storage member and an object. The second accommodating member is rotatably disposed on the first accommodating member. The force storage member is disposed between the first accommodating member and the second accommodating member. Opposite ends of the force storage member are connected to the first accommodating member and the second accommodating member. The object is connected to the second accommodating member. When an external force is exerted on the object and a torque generated by the external force is larger than a torque provided by the force storage member, the external force forces the object to drive the second accommodating member to rotate with respect to the first accommodating member.

According to another embodiment of the disclosure, an image detection device comprises a host device, an image sensing module and an overload protection mechanism. The image sensing module senses an image information and transmits the image information to the host device. The overload protection mechanism is disposed on the host device. The overload protection mechanism comprises a first accommodating member, a second accommodating member, a force storage member and an object. The second accommodating member is rotatably disposed on the first accommodating member. The force storage member is disposed between the first accommodating member and the second accommodating member. Opposite ends of the force storage member are connected to the first accommodating member and the second accommodating member. The object is connected to the second accommodating member. The image sensing module is disposed on the object. When an external force is exerted on the object and a torque generated by the external force is larger than a torque provided by the force storage member, the external force forces the object to drive the second accommodating member to rotate with respect to the first accommodating member.

As mentioned in the above, the overload protection mechanism of the disclosure is adapted to the image detection device or other devices, so as to prevent the device from toppling over due to overload. In practical applications, the first accommodating member of the overload protection mechanism may be connected to the host device of the device. The torque provided by the force storage member may be preset to be a specific value (e.g. the torque generated by the external force not toppling the device) according to practical requirement. When the torque generated by the external force exerted on the object is smaller than or equal to the torque provided by the force storage member, the object stays motionless. When the torque generated by the external force exerted on the object is larger than the torque provided by the force storage member, the external force forces the object to drive the second accommodating member to rotate with respect to the first accommodating member. Accordingly, the device will not topple over due to excess external force exerted on the object.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
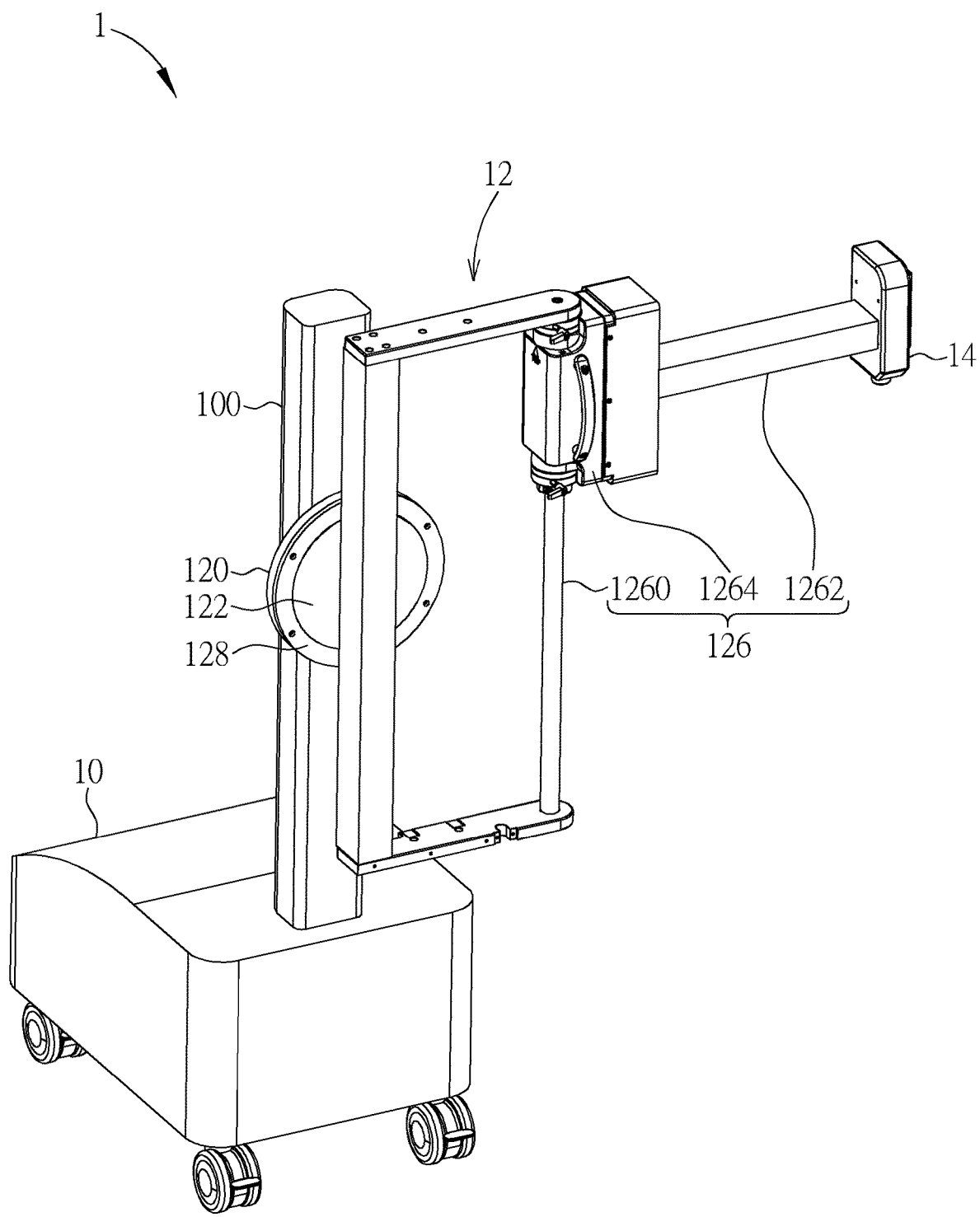
FIG. 1 is a perspective view illustrating an image detection device according to an embodiment of the disclosure.
Figure 2:
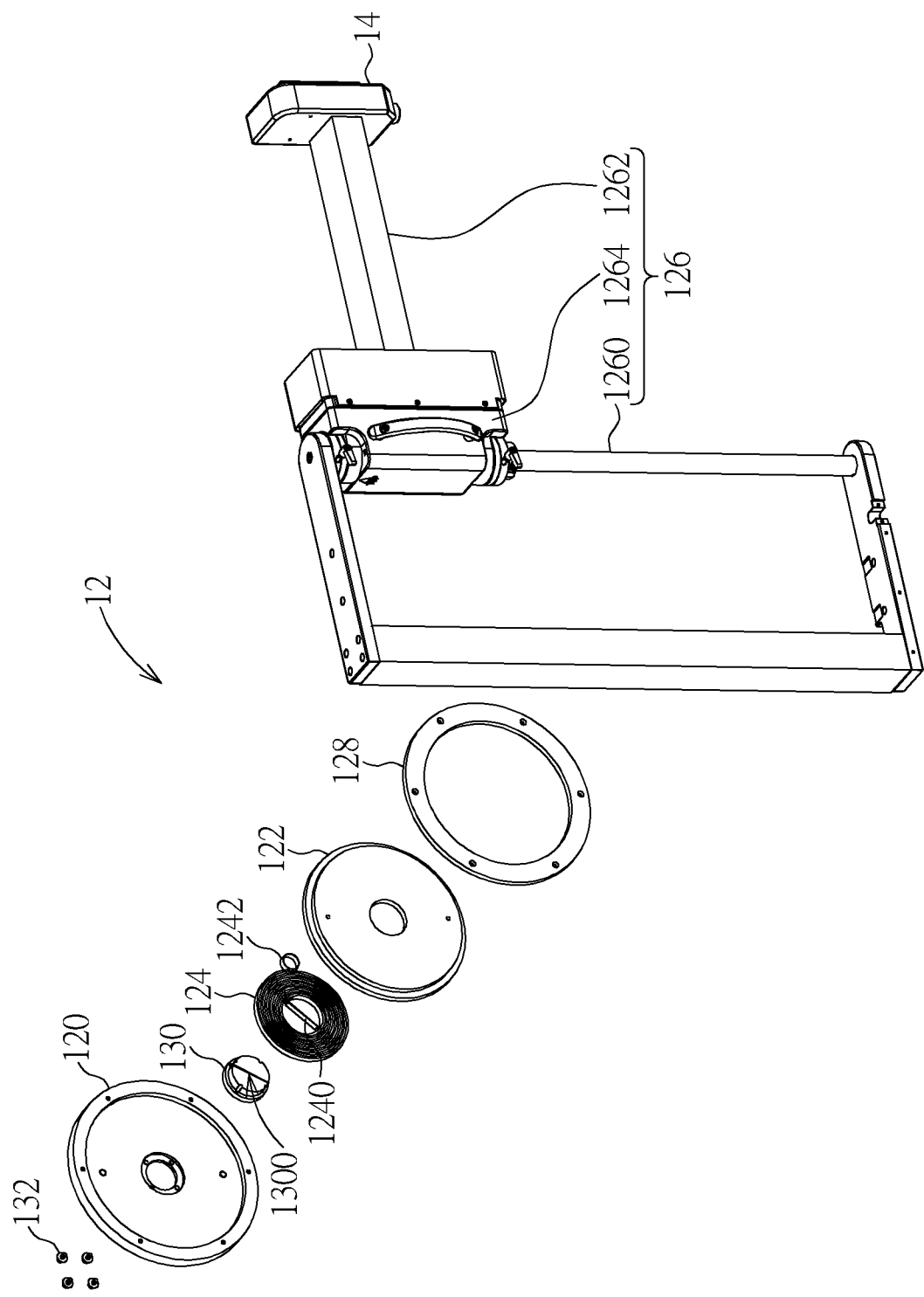
FIG. 2 is a partial exploded view illustrating the overload protection mechanism shown in FIG. 1.
Figure 3:
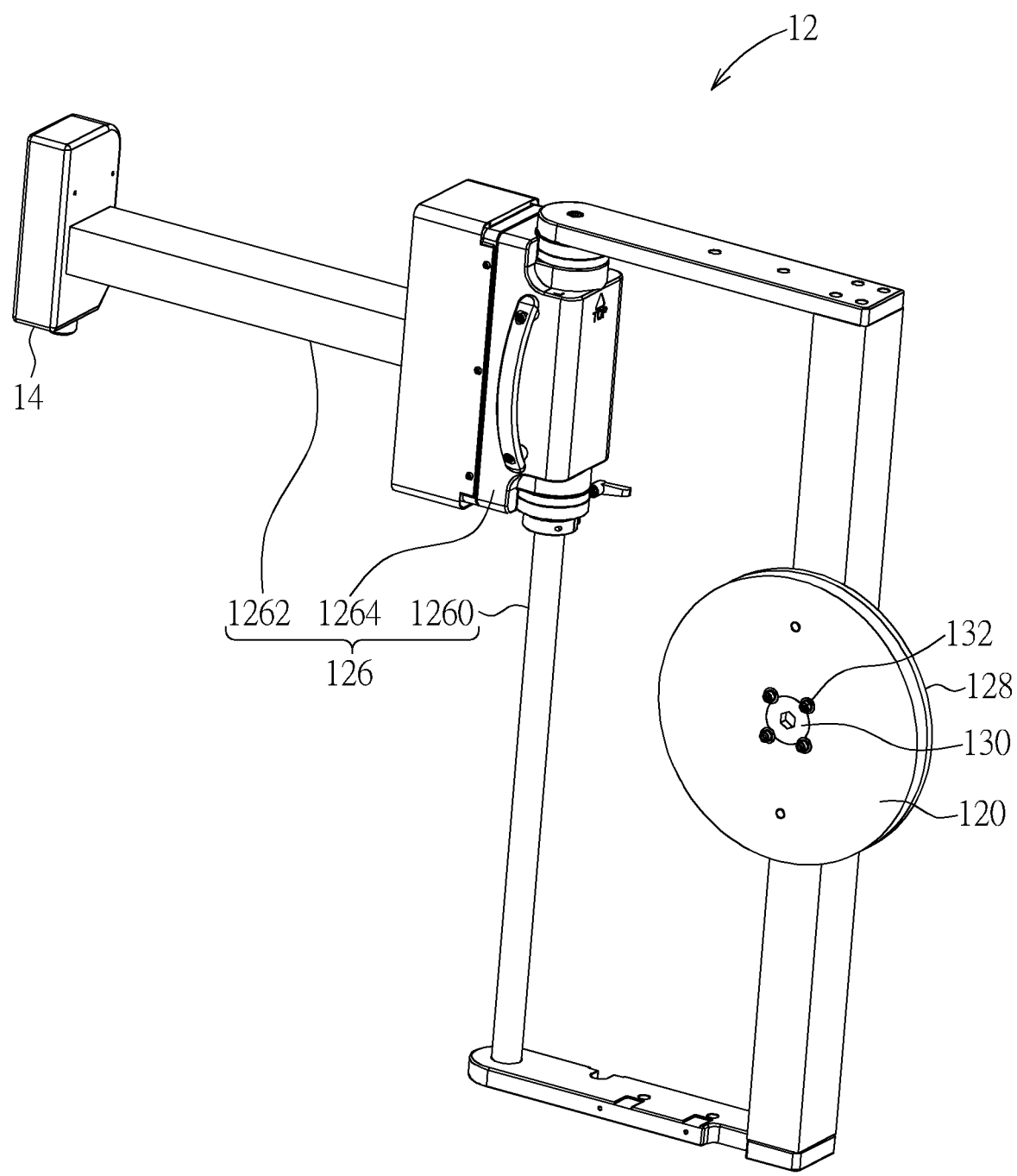
FIG. 3 is a perspective view illustrating the overload protection mechanism shown in FIG. 1 from another viewing angle.
Figure 4:
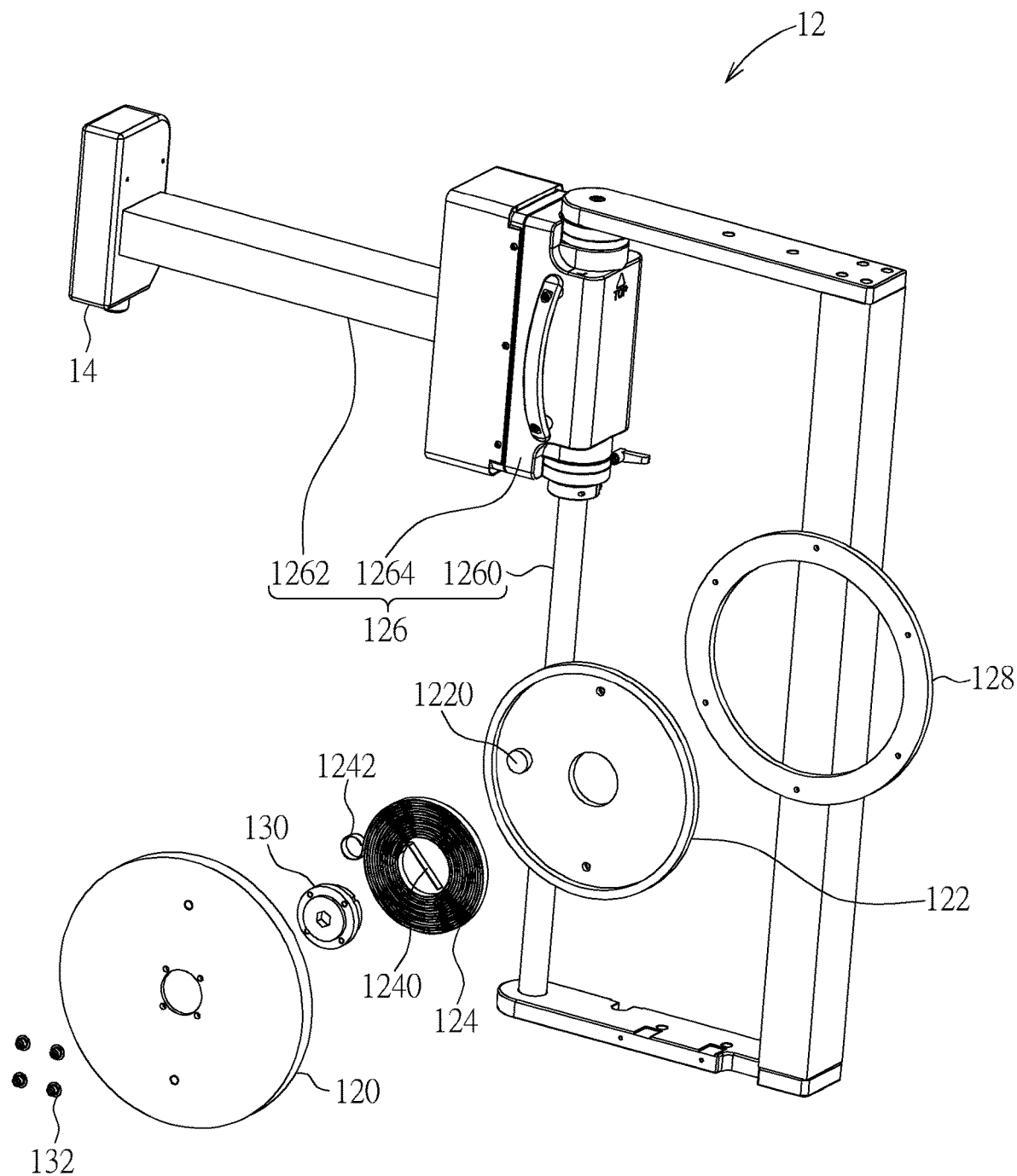
FIG. 4 is a partial exploded view illustrating the overload protection mechanism shown in FIG. 3.

Referring to FIGS. 1 to 4, FIG. 1 is a perspective view illustrating an image detection device 1 according to an embodiment of the disclosure, FIG. 2 is a partial exploded view illustrating the overload protection mechanism 12 shown in FIG. 1, FIG. 3 is a perspective view illustrating the overload protection mechanism 12 shown in FIG. 1 from another viewing angle, and FIG. 4 is a partial exploded view illustrating the overload protection mechanism 12 shown in FIG. 3.

As shown in FIG. 1, the image detection device 1 comprises a host device 10, an overload protection mechanism 12 and an image sensing module 14. In this embodiment, the image detection device 1 may be, but not limited to, a skin detection device and the image sensing module 14 may be, but not limited to, a skin detector. In another embodiment, the image detection device 1 may also be any devices requiring overload protection. In this embodiment, the host device 10 may comprise a support pillar 100 and the overload protection mechanism 12 may be disposed on the support pillar 100. The image sensing module 14 is used to sense an image information and transmit the image information to the host device 10, so as to perform related image processing and analysis processes.

As shown in FIGS. 2 to 4, the overload protection mechanism 12 comprises a first accommodating member 120, a second accommodating member 122, a force storage member 124, an object 126 and a cover plate 128. The second accommodating member 122 is rotatably disposed on the first accommodating member 120. The cover plate 128 covers a periphery of the second accommodating member 122 and is connected to the first accommodating member 120. In other words, the second accommodating member 122 is sandwiched in between the first accommodating member 120 and the cover plate 128, such that the second accommodating member 122 is capable of rotating with respect to the first accommodating member 120.

The force storage member 124 is disposed between the first accommodating member 120 and the second accommodating member 122, wherein opposite ends of the force storage member 124 are connected to the first accommodating member 120 and the second accommodating member 122. In this embodiment, the force storage member 124 may be a spiral spring and the first accommodating member 120 may comprise an adjusting member 130 and a plurality of fixing members 132. An end of the force storage member 124 is connected to the adjusting member 130. That is to say, an end of the force storage member 124 is connected to the first accommodating member 120 by the adjusting member 130.

As shown in FIG. 2, the force storage member 124 has a straight fixing end 1240 and the adjusting member 130 has a slot 1300. The straight fixing end 1240 may be embedded into the slot 1300, so as to connect the force storage member 124 to the adjusting member 130. Furthermore, as shown in FIG. 4, the force storage member 124 has a circular fixing end 1242 and the second accommodating member 122 has a fixing pillar 1220. The circular fixing end 1242 may be sleeved on the fixing pillar 1220, so as to connect the force storage member 124 to the second accommodating member 122.

In this embodiment, the adjusting member 130 is rotatable. Accordingly, a user may rotate the adjusting member 130 to drive the straight fixing end 1240 of the force storage member 124 to rotate, such that the force storage member 124 stores a torque. In other words, the adjusting member 130 is used to adjust the torque provided by the force storage member 124. After adjusting the torque provided by the force storage member 124 to a specific value (e.g. the torque generated by an external force not toppling the device), the user may use the fixing members 132 to fix the adjusting member 130, so as to keep the torque provided by the force storage member 124 to be constant. In this embodiment, the fixing members 132 may be screws.

The object 126 is connected to the second accommodating member 122. In this embodiment, the object 126 may comprise a frame 1260 and an arm 1262, wherein the frame 1260 is connected to the second accommodating member 122 and the arm 1262 is connected to the frame 1260. The image sensing module 14 is disposed on an end of the arm 1262 of the object 126. It should be noted that the structure of the object 126 may be determined according to practical applications, so the frame 1260 and the arm 1262 are optional for the object 126.

Figure 5:
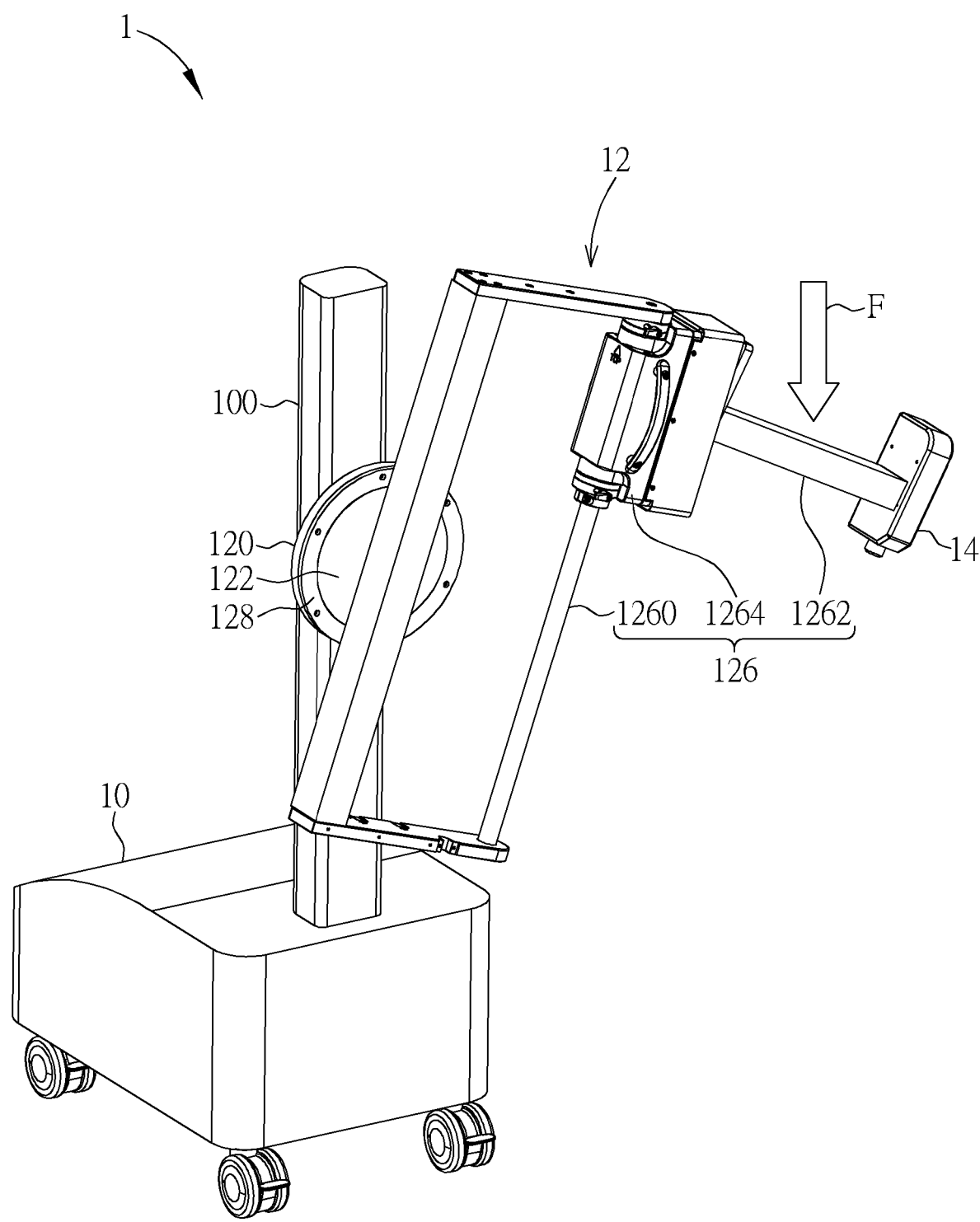
FIG. 5 is a perspective view illustrating an external force exerted on the arm of the object.

Referring to FIG. 5, FIG. 5 is a perspective view illustrating an external force F exerted on the arm 1262 of the object 126. As shown in FIG. 5, when an external force F is exerted on the arm 1262 of the object 126 and a torque generated by the external force F is larger than a torque provided by the force storage member 124, the external force F forces the object 126 to drive the second accommodating member 122 to rotate with respect to the first accommodating member 120. Accordingly, the device 1 will not topple over due to excess external force F exerted on the object 126. Needless to say, when the torque generated by the external force F is smaller than or equal to the torque provided by the force storage member 124, the object 126 will stay motionless and be kept at the position shown in FIG. 1.

Figure 6:
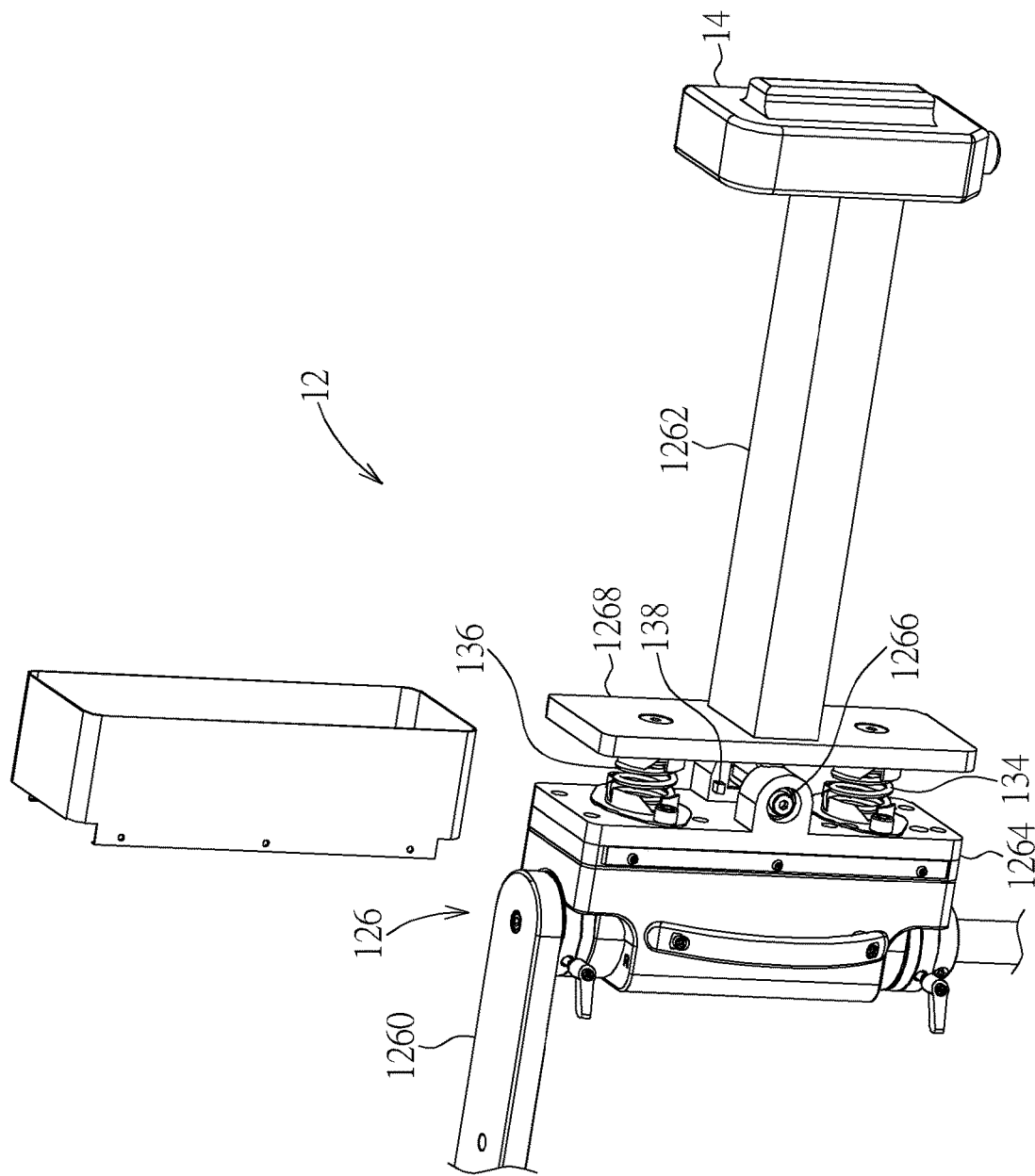
FIG. 6 is another partial exploded view illustrating the overload protection mechanism shown in FIG. 1.
Figure 7:
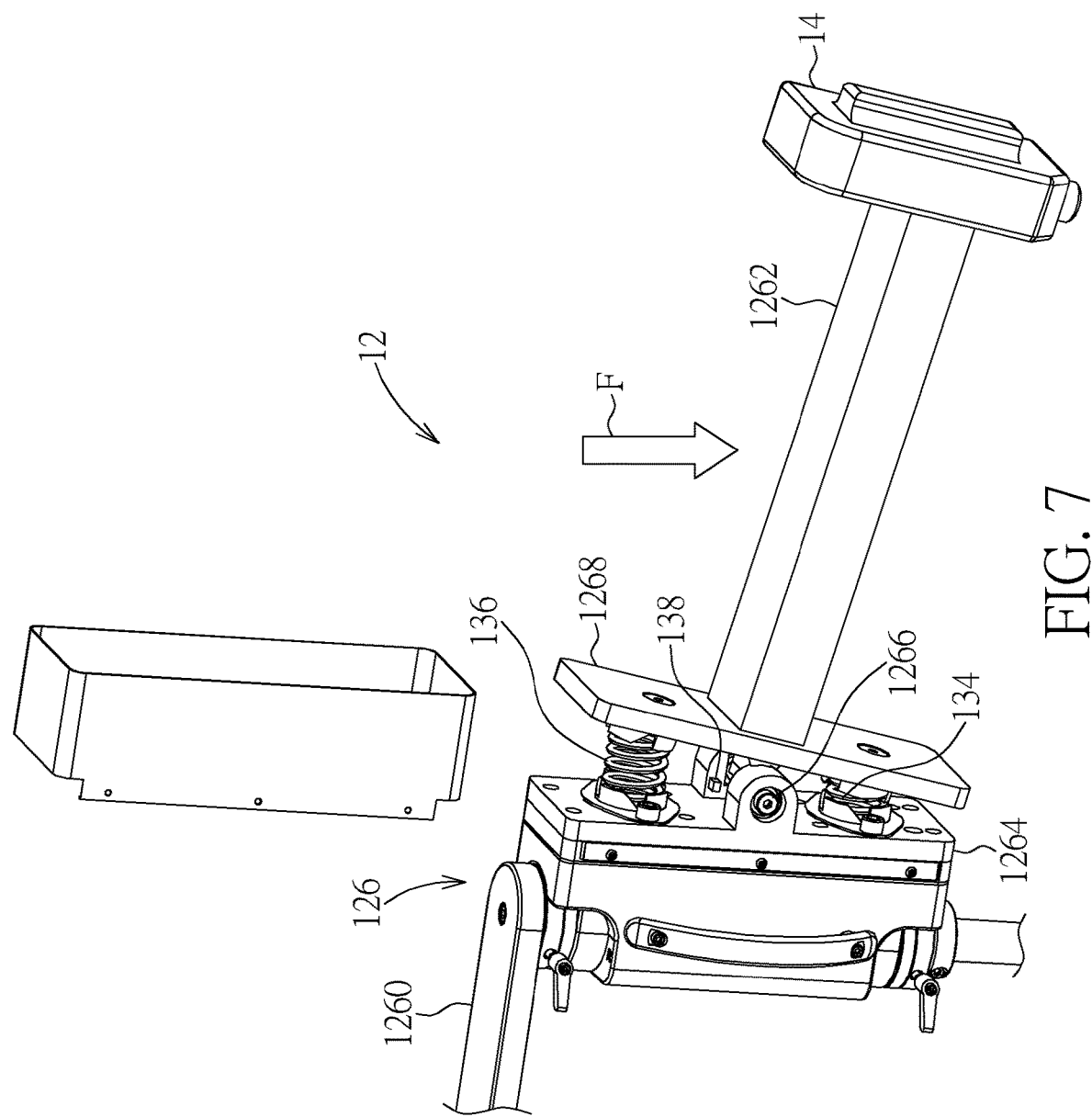
FIG. 7 is a perspective view illustrating the external force exerted on the arm of the object.
Figure 8:
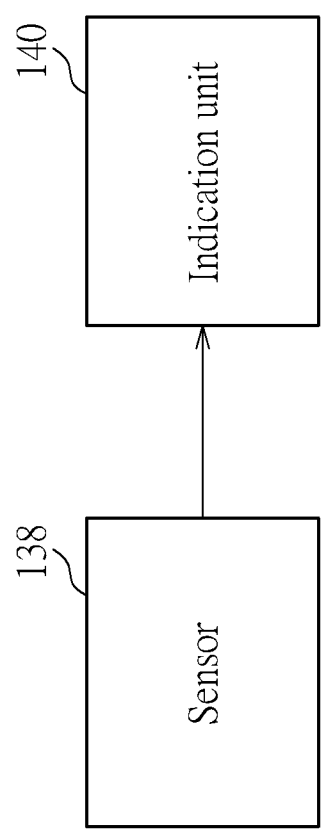
FIG. 8 is a functional block diagram illustrating the sensor and the indication unit.

Referring to FIGS. 6 to 8, FIG. 6 is another partial exploded view illustrating the overload protection mechanism 12 shown in FIG. 1, FIG. 7 is a perspective view illustrating the external force F exerted on the arm 1262 of the object 126, and FIG. 8 is a functional block diagram illustrating the sensor 138 and the indication unit 140. As shown in FIG. 6, the object 126 may comprise a bracket 1264 and the bracket 1264 may comprise a shaft 1266. Furthermore, the arm 1262 may comprise a plate member 1268 and the plate member 1268 is pivotally connected to the shaft 1266. In other words, the arm 1262 may rotate with respect to the bracket 1264 by the shaft 1266. In this embodiment, the overload protection mechanism 12 may further comprise a first elastic member 134 and a second elastic member 136. The first elastic member 134 and the second elastic member 136 are disposed between the bracket 1264 and the plate member 1268, wherein opposite ends of the first elastic member 134 are connected to the bracket 1264 and the plate member 1268, and opposite ends of the second elastic member 136 are also connected to the bracket 1264 and the plate member 1268. Still further, the first elastic member 134 and the second elastic member 136 are located at opposite sides of the shaft 1266. In this embodiment, the first elastic member 134 and the second elastic member 136 may be springs.

In this embodiment, the overload protection mechanism 12 may further comprise a sensor 138 and an indication unit 140, wherein the sensor 138 is disposed around the shaft 1266 and the indication unit 140 is electrically connected to the sensor 138. In this embodiment, the indication unit 140 may be disposed at any positions in the device 1 according to practical applications. The sensor 138 is used to sense a rotation angle of the arm 1262. In this embodiment, the sensor 138 may be an optical sensor or a mechanical sensor, and the indication unit 140 may be an alarm or other indication components according to practical applications.

As shown in FIG. 7, when the external force F is exerted on the arm 1262 of the object 126 and the torque generated by the external force F is larger than a product torque of the first elastic member 134 and the second elastic member 136, the external force F forces the arm 1262 to rotate around the shaft 1266. When the rotation angle of the arm 1262 is larger than a threshold, the indication unit 140 sends out an indication message for a user to indicate that the external force F exerted on the arm 1262 of the object 126 has been excess. In this embodiment, the indication message may be sound, text, image, light, or a combination thereof according to practical applications. Accordingly, the user may reduce the external force F in time, so as to prevent the device 1 from toppling over due to excess external force F exerted on the arm 1262 of the object 126.

Figure 9:
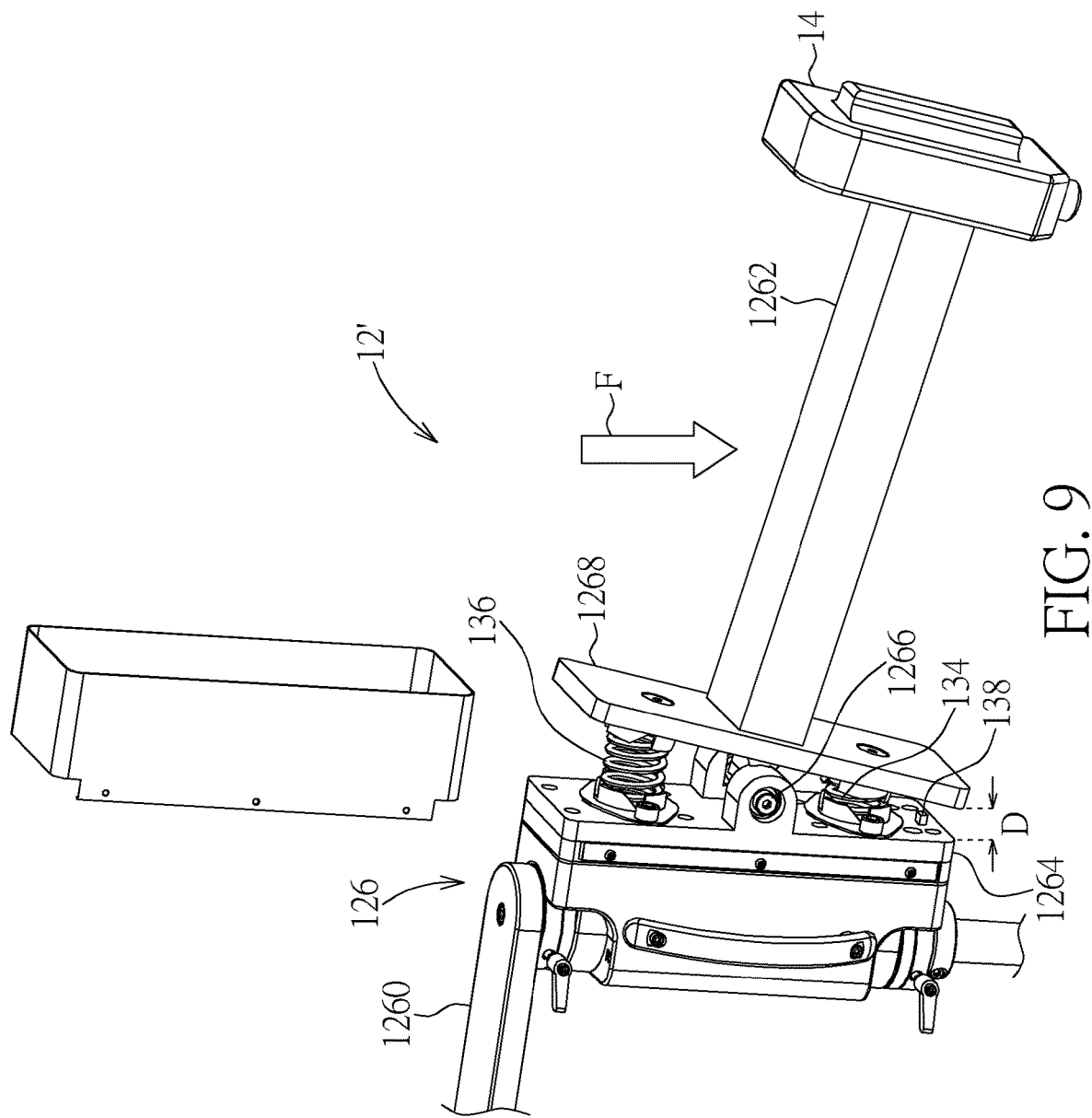
FIG. 9 is a partial exploded view illustrating an overload protection mechanism according to another embodiment of the disclosure.

Referring to FIG. 9, FIG. 9 is a partial exploded view illustrating an overload protection mechanism 12' according to another embodiment of the disclosure. The main difference between the overload protection mechanism 12' and the overload protection mechanism 12 is that the sensor 138 of the overload protection mechanism 12' is disposed at an end of the bracket 1264, as shown in FIG. 9. Furthermore, the aforesaid sensor 138 (shown in FIG. 8) is used to sense a distance D between the plate member 1268 and the bracket 1264. As shown in FIG. 9, when the external force F is exerted on the arm 1262 of the object 126 and the torque generated by the external force F is larger than a product torque of the first elastic member 134 and the second elastic member 136, the external force F forces the arm 1262 to rotate around the shaft 1266, such that the distance D between the plate member 1268 and the bracket 1264 decreases. When the distance D between the plate member 1268 and the bracket 1264 is smaller than a threshold, the aforesaid indication unit 140 (as shown in FIG. 8) sends out an indication message for a user to indicate that the external force F exerted on the arm 1262 of the object 126 has been excess. Accordingly, the user may reduce the external force F in time, so as to prevent the device 1 from toppling over due to excess external force F exerted on the arm 1262 of the object 126.

Figure 10:
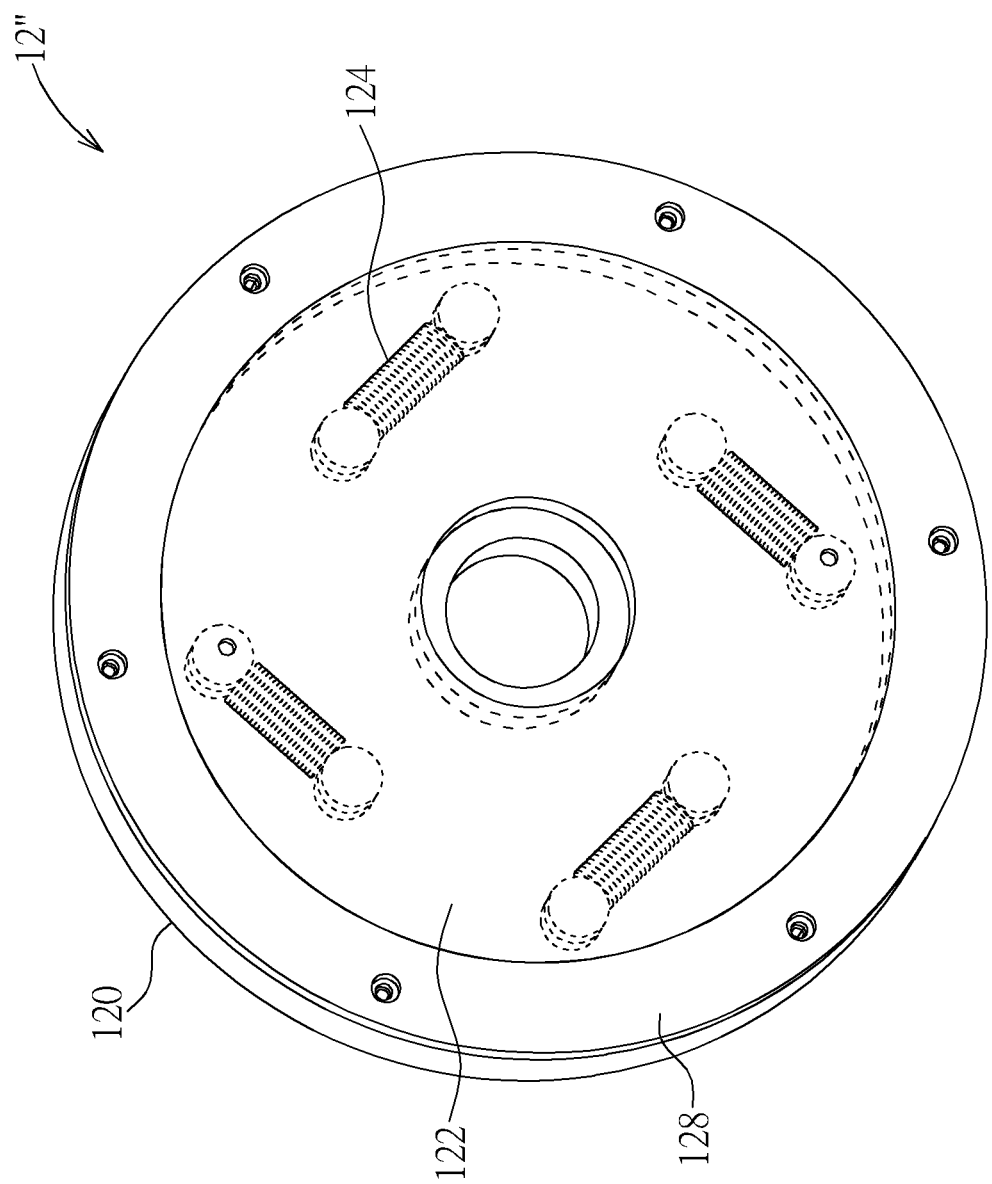
FIG. 10 is a perspective view illustrating an overload protection mechanism according to another embodiment of the disclosure.
Figure 11:
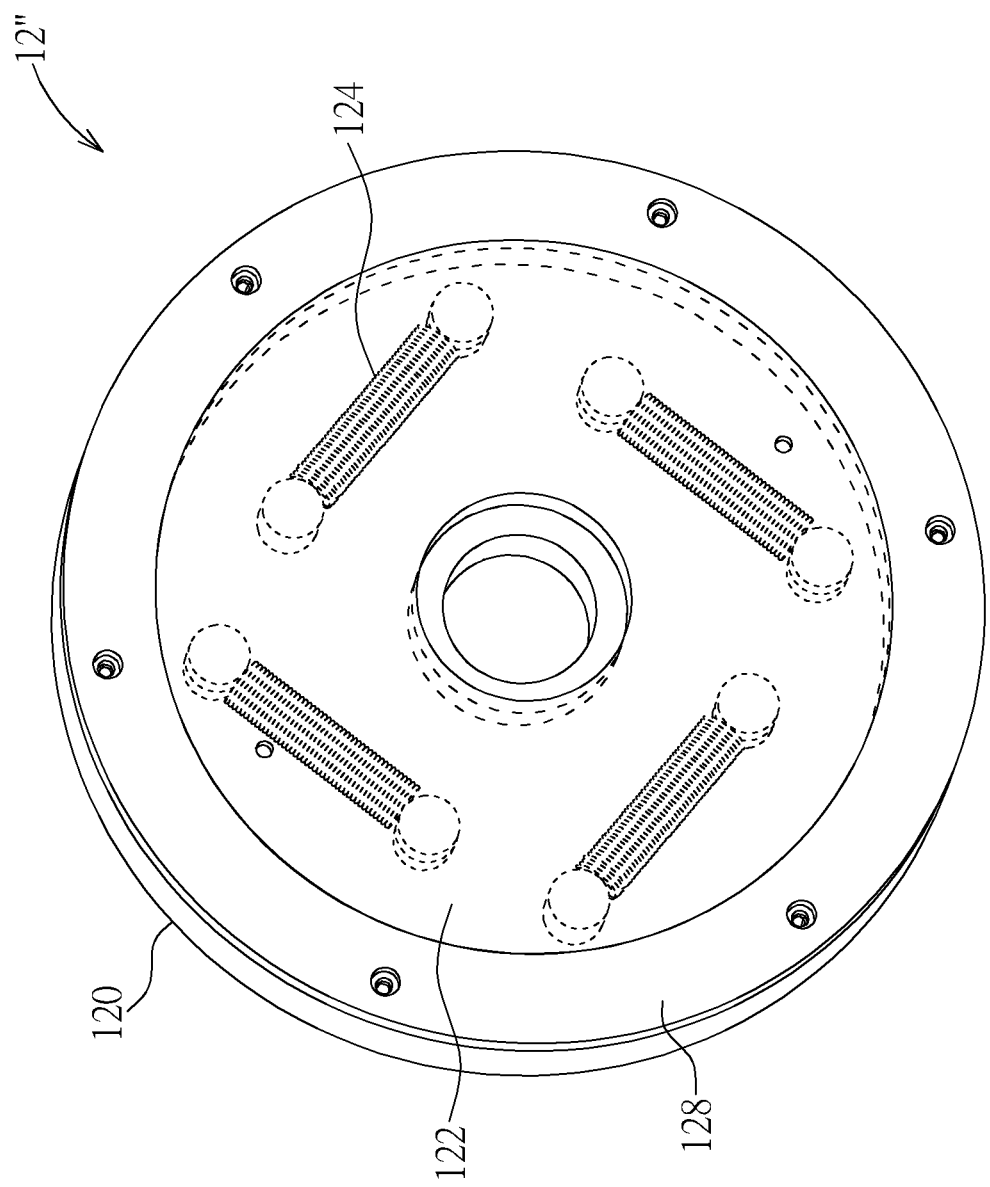
FIG. 11 is a perspective view illustrating the second accommodating member shown in FIG. 10 after rotating with respect to the first accommodating member.

Referring to FIGS. 10 and 11, FIG. 10 is a perspective view illustrating an overload protection mechanism 12" according to another embodiment of the disclosure and FIG. 11 is a perspective view illustrating the second accommodating member 122 shown in FIG. 10 after rotating with respect to the first accommodating member 120. The main difference between the overload protection mechanism 12" and the overload protection mechanism 12 is that the force storage member 124 of the overload protection mechanism 12" is a tension spring. As shown in FIGS. 10 and 11, the overload protection mechanism 12" comprises four force storage members 124 and the first accommodating member 120 of the overload protection mechanism 12" does not comprise the aforesaid adjusting member 130 and fixing members 132. It should be noted that the number of the force storage members 124 may be determined according to practical applications, so the disclosure is not limited to the embodiment shown in the figures.

When the external force F is exerted on the arm 1262 of the object 126 (as shown in FIG. 5) and the torque generated by the external force F is larger than the torque provided by the force storage members 124, the external force F forces the object 126 to drive the second accommodating member 122 to rotate with respect to the first accommodating member 120, such that the force storage members 124 are stretched (as shown in FIG. 11). Accordingly, the device 1 will not topple over due to excess external force F exerted on the object 126. Needless to say, when the torque generated by the external force F is smaller than or equal to the torque provided by the force storage members 124, the object 126 will stay motionless and be kept at the position shown in FIG. 1.

As mentioned in the above, the overload protection mechanism of the disclosure is adapted to the image detection device or other devices, so as to prevent the device from toppling over due to overload. In practical applications, the first accommodating member of the overload protection mechanism may be connected to the host device of the device. The torque provided by the force storage member may be preset to be a specific value (e.g. the torque generated by the external force not toppling the device) according to practical requirement. When the torque generated by the external force exerted on the object is smaller than or equal to the torque provided by the force storage member, the object stays motionless. When the torque generated by the external force exerted on the object is larger than the torque provided by the force storage member, the external force forces the object to drive the second accommodating member to rotate with respect to the first accommodating member. Accordingly, the device will not topple over due to excess external force exerted on the object. Moreover, the disclosure may utilize the sensor and the indication unit to send out the indication message for the user to indicate that the external force exerted on the object has been excess. Accordingly, the user may reduce the external force in time, so as to prevent the device from toppling over due to excess external force exerted on the object.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An overload protection mechanism comprising:
a first accommodating member;
a second accommodating member rotatably disposed on the first accommodating member;
a force storage member disposed between the first accommodating member and the second accommodating member, opposite ends of the force storage member being connected to the first accommodating member and the second accommodating member; and
an object connected to the second accommodating member;
wherein when an external force is exerted on the object and a torque generated by the external force is larger than a torque provided by the force storage member, the external force forces the object to drive the second accommodating member to rotate with respect to the first accommodating member.

2. The overload protection mechanism of claim 1, wherein the force storage member is a spiral spring.

3. The overload protection mechanism of claim 1, wherein the first accommodating member comprises an adjusting member, an end of the force storage member is connected to the adjusting member, and the adjusting member is rotatable to adjust the torque provided by the force storage member.

4. The overload protection mechanism of claim 3, wherein the first accommodating member further comprises a plurality of fixing members and the fixing members fix the adjusting member to keep the torque provided by the force storage member to be constant.

5. The overload protection mechanism of claim 1, further comprising a cover plate covering the second accommodating member and connected to the first accommodating member.

6. The overload protection mechanism of claim 1, wherein the object comprises a frame and an arm, the frame is connected to the second accommodating member, and the arm is connected to the frame.

7. The overload protection mechanism of claim 6, wherein the object comprises a bracket, the bracket comprises a shaft, the arm comprises a plate member, and the plate member is pivotally connected to the shaft.

8. The overload protection mechanism of claim 7, wherein the bracket is movably disposed on the frame.

9. The overload protection mechanism of claim 7, further comprising a first elastic member disposed between the bracket and the plate member, opposite ends of the first elastic member being connected to the bracket and the plate member.

10. The overload protection mechanism of claim 9, further comprising a second elastic member disposed between the bracket and the plate member, opposite ends of the second elastic member being connected to the bracket and the plate member, the first elastic member and the second elastic member being located at opposite sides of the shaft.

11. The overload protection mechanism of claim 7, further comprising a sensor and an indication unit, the sensor being disposed around the shaft, the indication unit being electrically connected to the sensor, the sensor sensing a rotation angle of the arm, the indication unit sending out an indication message when the rotation angle is larger than a threshold.

12. The overload protection mechanism of claim 7, further comprising a sensor and an indication unit, the sensor being disposed at an end of the bracket, the indication unit being electrically connected to the sensor, the sensor sensing a distance between the plate member and the bracket, the indication unit sending out an indication message when the distance is smaller than a threshold.

13. An image detection device comprising:
a host device;
an image sensing module sensed an image information and transmitting the image information to the host device; and
an overload protection mechanism disposed on the host device, the overload protection mechanism comprising:
a first accommodating member;
a second accommodating member rotatably disposed on the first accommodating member;
a force storage member disposed between the first accommodating member and the second accommodating member, opposite ends of the force storage member being connected to the first accommodating member and the second accommodating member; and
an object connected to the second accommodating member, the image sensing module being disposed on the object;
wherein when an external force is exerted on the object and a torque generated by the external force is larger than a torque provided by the force storage member, the external force forces the object to drive the second accommodating member to rotate with respect to the first accommodating member.

14. The image detection device of claim 13, wherein the force storage member is a spiral spring.

15. The image detection device of claim 13, wherein the first accommodating member comprises an adjusting member and a plurality of fixing members, an end of the force storage member is connected to the adjusting member, the adjusting member is rotatable to adjust the torque provided by the force storage member, and the fixing members fix the adjusting member to keep the torque provided by the force storage member to be constant.

16. The image detection device of claim 13, wherein the overload protection mechanism further comprises a cover plate covering the second accommodating member and connected to the first accommodating member.

17. The image detection device of claim 13, wherein the object comprises a frame, an arm and a bracket, the frame is connected to the second accommodating member, the arm is connected to the frame, the bracket comprises a shaft, the arm comprises a plate member, and the plate member is pivotally connected to the shaft.

18. The image detection device of claim 17, wherein the overload protection mechanism further comprises:
a first elastic member disposed between the bracket and the plate member, opposite ends of the first elastic member being connected to the bracket and the plate member; and
a second elastic member disposed between the bracket and the plate member, opposite ends of the second elastic member being connected to the bracket and the plate member, the first elastic member and the second elastic member being located at opposite sides of the shaft.

19. The image detection device of claim 17, wherein the overload protection mechanism further comprises a sensor and an indication unit, the sensor is disposed around the shaft, the indication unit is electrically connected to the sensor, the sensor senses a rotation angle of the arm, and the indication unit sends out an indication message when the rotation angle is larger than a threshold.

20. The image detection device of claim 17, wherein the overload protection mechanism further comprises a sensor and an indication unit, the sensor is disposed at an end of the bracket, the indication unit is electrically connected to the sensor, the sensor senses a distance between the plate member and the bracket, and the indication unit sends out an indication message when the distance is smaller than a threshold.

* * * * *